United States Patent
Unami et al.

(10) Patent No.: US 11,224,914 B2
(45) Date of Patent: Jan. 18, 2022

(54) POWDER MIXTURE FOR POWDER METALLURGY AND METHOD OF MANUFACTURING SAME

(71) Applicant: JFE STEEL CORPORATION, Tokyo (JP)

(72) Inventors: Shigeru Unami, Tokyo (JP); Masato Oya, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 55 days.

(21) Appl. No.: 16/613,122

(22) PCT Filed: Jun. 12, 2018

(86) PCT No.: PCT/JP2018/022447
§ 371 (c)(1),
(2) Date: Nov. 13, 2019

(87) PCT Pub. No.: WO2018/230568
PCT Pub. Date: Dec. 20, 2018

(65) Prior Publication Data
US 2020/0338637 A1 Oct. 29, 2020

(30) Foreign Application Priority Data

Jun. 16, 2017 (JP) .............................. JP2017-118266
Apr. 26, 2018 (JP) .............................. JP2018-085505

(51) Int. Cl.
| | | |
|---|---|---|
| C08K 3/11 | (2018.01) | |
| B22F 1/00 | (2006.01) | |
| C08K 3/04 | (2006.01) | |
| C22C 33/02 | (2006.01) | |

(52) U.S. Cl.
CPC .............. *B22F 1/0077* (2013.01); *C08K 3/04* (2013.01); *C08K 3/11* (2018.01); *C22C 33/0264* (2013.01); *B22F 2301/35* (2013.01); *B22F 2302/40* (2013.01); *C08K 2201/005* (2013.01)

(58) Field of Classification Search
CPC .............. B22F 1/0077; B22F 2301/35; B22F 2302/40; C08K 3/11; C08K 3/04; C08K 2201/005
USPC ...................................................... 524/435
See application file for complete search history.

(56) References Cited

U.S. PATENT DOCUMENTS

| 6,860,918 | B2 | 3/2005 | Ozaki et al. |
| 7,416,578 | B2 | 8/2008 | Ahlin et al. |
| 7,867,314 | B2 | 1/2011 | Ono et al. |
| 9,149,869 | B2 | 10/2015 | Suzuki et al. |
| 9,352,393 | B2 | 5/2016 | Ono et al. |
| 2006/0065072 | A1* | 3/2006 | Ozaki .................. C22C 33/0228 75/231 |
| 2014/0230603 | A1 | 8/2014 | Yanaka et al. |

FOREIGN PATENT DOCUMENTS

| CN | 101022903 A | 8/2007 |
| CN | 101801566 A | 8/2010 |
| CN | 103221163 A | 7/2013 |
| CN | 103990791 A | 8/2014 |
| CN | 104870125 A | 8/2015 |
| JP | 2005330547 A | 12/2005 |
| JP | 2008069460 A | 3/2008 |
| JP | 2011094187 A | 5/2011 |
| JP | 2012167302 A | 9/2012 |
| WO | 2009148402 A1 | 12/2009 |

OTHER PUBLICATIONS

Nov. 19, 2019, Notification of Reasons for Refusal issued by the Japan Patent Office in the corresponding Japanese Patent Application No. 2018-085505 with English language concise statement of relevance.
Aug. 21, 2018, International Search Report issued in the International Patent Application No. PCT/JP2018/022447.
Nov. 25, 2020, Office Action issued by the Korean Intellectual Property Office in the corresponding Korean Patent Application No. 10-2020-7000851 with English language concise statement of relevance.
Apr. 19, 2021, Office Action issued by the China National Intellectual Property Administration in the corresponding Chinese Patent Application No. 201880037324.9 with English language search report.
Sep. 28, 2021, Office Action issued by the Canadian Intellectual Property Office in the corresponding Canadian Patent Application No. 3,064,062.

* cited by examiner

*Primary Examiner* — Doris L Lee
(74) *Attorney, Agent, or Firm* — Kenja IP Law PC

(57) ABSTRACT

The powder mixture for powder metallurgy includes a raw material powder, a binder, and a graphite powder, where the raw material powder contains an iron-based powder in a content of 90 mass % or more of the raw material powder, the graphite powder has an average particle size of less than 5 μm, a ratio in mass of the binder to the sum the raw material powder and the graphite powder is 0.10 mass % to 0.80 mass %, a ratio of mass of the graphite powder to the sum of mass of the raw material powder and mass of the graphite powder is 0.6 mass % to 1.0 mass %, surface of the raw material powder is covered with at least a part of the binder, and surface of the binder covering the surface of the raw material powder is covered with at least a part of the graphite powder.

9 Claims, No Drawings

POWDER MIXTURE FOR POWDER METALLURGY AND METHOD OF MANUFACTURING SAME

TECHNICAL FIELD

This disclosure relates to a powder mixture for powder metallurgy, and particularly to a powder mixture for powder metallurgy which can be ejected from a die with less force at the time of compaction and suppresses die galling. In addition, this disclosure relates to a method of manufacturing the powder mixture for powder metallurgy.

BACKGROUND

Powder metallurgy includes forming a raw material powder mainly composed of an iron-based powder into a green compact using a die, and subjecting the green compact to sintering to obtain a sintered part. In order to improve the formability at the time of compaction, it is usual to add a lubricant to the raw material powder and to make the lubricant adhere to the surface of the die used in the compaction. If no lubricant is used, the iron-based powder contained in the raw material powder is in direct contact with the die, which increases friction. As a result, a desired green density cannot be obtained at the time of compaction, and a large force is required for ejecting the green compact from the die after the compaction.

For these reasons, various lubricants are used in green compacting. Examples of the lubricant include metal soaps such as lithium stearate and zinc stearate, and amide-based lubricants such as ethylenebis stearamide.

Furthermore, JP 2005-330547 A (PTL 1) proposes using a graphite powder to improve the lubricity. When the surface of the iron-based powder is covered with graphite, the lubricity of the surface of the iron-based powder is improved. In addition, direct contact between the iron-based powder and the die is avoided by interposing graphite therebetween, so that die galling is prevented.

CITATION LIST

Patent Literature

PTL 1: JP 2005-330547 A

SUMMARY

Technical Problem

As proposed in PTL 1, using an iron-based powder which is covered with a graphite powder can reduce friction at the time of compaction and reduce the force required for ejecting the compact from the die. However, it was found that the powder mixture of PTL 1 has the following problems.

PTL 1 uses fluid dispersion, in which graphite and a binder are dispersed in water or an organic solvent, to cover the surface of an iron-based powder with a graphite powder, and therefore it requires production equipment capable of handling liquid raw materials. In particular, it is necessary to provide an apparatus for recovering and processing spent solvent.

In addition, PTL 1 uses a binder to adhere the graphite powder to the iron-based powder. As a result of investigating the powder mixture obtained with the above-described method, however, it was found that the binder is also present on the surface of the graphite powder adhering to the iron-based powder. Due to the presence of the binder on the powder surface, the flowability of the powder mixture cannot be sufficiently improved.

It could thus be helpful to provide a powder mixture for powder metallurgy which is extremely excellent in flowability, can be ejected from a die with less force, and suppresses die galling at the time of compaction. In addition, it could be helpful to provide a method of manufacturing the powder mixture for powder metallurgy without using any solvent.

Solution to Problem

We engaged in intensive studies on the above problems and made the following discoveries.

(1) In the case where a raw material powder, a graphite powder, and a binder are simultaneously mixed, the surface of the graphite powder is also covered with the binder, and it is impossible to uniformly cover the outermost surface of the raw material powder with graphite.

(2) By covering the surface of a raw material powder with a binder and then with a fine graphite powder, it is possible to prevent the surface of the graphite powder from being covered with the binder. In this way, it is possible to obtain a powder mixture for powder metallurgy which is extremely excellent in flowability, can be ejected from a die with less force at the time of compaction, and suppresses die galling.

The present disclosure is based on the above discoveries and has the following primary features.

1. A powder mixture for powder metallurgy, comprising a raw material powder, a binder, and a graphite powder, wherein the raw material powder contains an iron-based powder in a content of 90 mass % or more of the raw material powder, the graphite powder has an average particle size of less than 5 μm, a ratio of mass of the binder ($m_b$) to the sum of mass of the raw material powder ($m_r$) and mass of the graphite powder ($m_g$), expressed as [$m_b/(m_r+m_g)\times 100$], is 0.10 mass % to 0.80 mass %, a ratio of mass of the graphite powder ($m_g$) to the sum of mass of the raw material powder ($m_r$) and mass of the graphite powder ($m_g$), expressed as [$m_g/(m_r+m_g)\times 100$], is 0.6 mass % to 1.0 mass %, surface of the raw material powder is covered with at least a part of the binder, and surface of the binder covering the surface of the raw material powder is covered with at least a part of the graphite powder.

2. The powder mixture for powder metallurgy according to 1., wherein the binder is at least one selected from the group consisting of fatty acid amide, copolymerized polyamide, polyurethane, and polyethylene.

3. The powder mixture for powder metallurgy according to 1. or 2., wherein the raw material powder contains at least one auxiliary raw material selected from the group consisting of alloying powder and machinability improvement powder.

4. A method of manufacturing a powder mixture for powder metallurgy, comprising:

first mixing where a raw material powder and a binder are mixed at a temperature equal to or higher than a melting point of the binder to obtain a powder covered with binder, and second mixing where the powder covered with binder and a graphite powder having an average particle size of less than 5 μm are mixed at a temperature equal to or higher than the melting point of the binder to obtain a powder mixture for powder metallurgy, wherein the raw material powder contains an iron-based powder in a content of 90 mass % or more of the raw material powder, a ratio of mass of the binder ($m_b$) to the sum of mass of the raw material powder ($m_r$) and mass of the graphite powder ($m_g$), expressed as $[m_b/(m_r+m_g)\times100]$, is 0.10 mass % to 0.80 mass %, and a ratio of mass of the graphite powder ($m_g$) to the sum of mass of the raw material powder ($m_r$) and mass of the graphite powder ($m_g$), expressed as $[m_g/(m_r+m_g)\times100]$, is 0.6 mass % to 1.0 mass %.

5. The method of manufacturing a powder mixture for powder metallurgy according to 4., wherein the binder is at least one selected from the group consisting of fatty acid amide, copolymerized polyamide, polyurethane, and polyethylene.

6. The method of manufacturing a powder mixture for powder metallurgy according to 4. or 5., wherein the raw material powder contains at least one auxiliary raw material selected from the group consisting of alloying powder and machinability improvement powder.

Advantageous Effect

The powder mixture for powder metallurgy of the present disclosure has extremely excellent flowability. Therefore, it can be ejected from a die with less force at the time of compaction, and at the same time, the compaction can be performed continuously without causing die galling. In this way, the yield rate of green compacts is improved, and high productivity can be realized. In addition, according to the manufacturing method of the present disclosure, the powder mixture for powder metallurgy can be manufactured without using any solvent.

DETAILED DESCRIPTION

The following describes the present disclosure in detail.

The powder mixture for powder metallurgy of the present disclosure contains a raw material powder, a binder, and a graphite powder as essential components. Each of the components is described below.

[Raw Material Powder]

The raw material powder is a powder containing an iron-based powder. The ratio of the iron-based powder in the raw material powder is 90 mass % or more, and more preferably 95 mass % or more. On the other hand, the upper limit of the ratio of the iron-based powder in the raw material powder is not particularly limited, and may be 100 mass %. That is, the raw material powder may consist only of an iron-based powder. However, from the viewpoint of imparting various properties to a final sintered body, it is preferable to use a mixed powder containing an iron-based powder and an auxiliary raw material described later as the raw material powder.

[Iron-Based Powder]

The iron-based powder is not particularly limited, and may be any powder. Examples of the iron-based powder include iron powder (so-called pure iron powder) and alloyed steel powder. The alloyed steel powder is preferably at least one selected from the group consisting of: pre-alloyed steel powder (completely alloyed steel powder) obtained by pre-alloying an alloying element during smelting; partial diffusion-alloyed steel powder obtained by partially diffusing and alloying an alloying element in an iron powder; and hybrid steel powder obtained by further partially diffusing an alloying element in a pre-alloyed steel powder. Note that the "iron-based powder" here refers to a metal powder having an Fe content of 50 mass % or more, and the "iron powder" refers to a powder consisting of Fe and inevitable impurities.

The method of producing the iron-based powder is not limited, and an iron-based powder produced with any method may be used. Examples of the iron-based powder that can be suitably used include atomized iron-based powder produced by atomization, and reduced iron-based powder produced by reduction.

The average particle size of the iron-based powder is not particularly limited, but preferably 70 μm to 100 μm. Note that the particle size of the iron-based powder is a value measured with the dry sieving method based on JIS Z 2510: 2004 unless otherwise specified.

[Auxiliary Raw Material]

The auxiliary raw material is not particularly limited, and may be any material such as one generally used as an auxiliary raw material in powder metallurgy. The auxiliary raw material is preferably at least one selected from the group consisting of alloying powder and machinability improvement powder. Generally, the alloying powder may be a metal powder. The metal powder, for example, is preferably at least one selected from the group consisting of Cu powder, Ni powder, and Mo powder. The machinability improvement powder may be MnS, for example. The ratio of the auxiliary raw material in the raw material powder is 10 mass % or less.

[Binder]

The surface of the raw material powder is covered with at least a part of a binder. The binder may be anything as long as it can adhere a graphite powder to the surface of the raw material powder. For example, it may be at least one selected from the group consisting of fatty acid amide such as fatty acid monoamide and fatty acid bisamide, and organic resin. Among the above, it is preferably an organic resin, and more preferably at least one resin selected from the group consisting of copolymerized polyamide, polyurethane, and polyethylene.

Addition Amount of Binder: 0.10 Mass % to 0.80 Mass %

When the addition amount of the binder is less than 0.10 mass %, the binder cannot sufficiently cover the surface of the raw material powder. Therefore, the addition amount of the binder is 0.10 mass % or more. On the other hand, when the addition amount of the binder exceeds 0.80 mass %, the binder also covers the surface of the graphite powder, which lowers the flowability. Therefore, the addition amount of the binder is 0.80 mass % or less. The addition amount of the binder here is defined as the ratio of mass of the binder ($m_b$) to the sum of mass of the raw material powder ($m_r$) and mass of the graphite powder ($m_g$), i.e. $[m_b/(m_r+m_g)\times100]$. In other words, when the total mass of the raw material powder and the graphite powder is 100 parts by mass, the mass of the binder is 0.10 parts by mass to 0.80 parts by mass.

The binder is preferably in the form of powder. When the average particle size of the binder is less than 5 μm, the cost for grinding the binder to such a size increases and the raw material cost increases. Therefore, from the viewpoint of reducing the cost, the average particle size of the binder is preferably 5 μm or more. On the other hand, when the average particle size of the binder exceeds 100 μm, the time required for uniformly mixing the binder with the raw material powder increases, which decreases the productivity. Therefore, from the viewpoint of further improving productivity, the average particle size of the binder is preferably 100 μm or less.

When the melting point of the binder is 60° C. or higher, it is possible to prevent the flowability of the powder mixture from being lowered even, for example, in the summer season with a high temperature. Therefore, the melting point of the binder is preferably 60° C. or higher. On the other hand, when the melting point of the binder exceeds 160° C., the time and energy required for heating the powers to a temperature equal to or higher than the melting point increase, which decreases the productivity. Therefore, from the viewpoint of further improving productivity, the melting point of the binder is preferably 160° C. or lower.

[Graphite Powder]

The surface of the binder covering the surface of the raw material powder is covered with at least a part of a graphite powder. In other words, the surface of the raw material powder is covered with a graphite powder via the binder. When the surface of the iron-based powder is covered with a graphite powder via the binder, the lubricity of the surface of the iron-based powder is improved. In addition, direct contact between the iron-based powder and a die is avoided by interposing graphite powder therebetween, so that the iron-based powder does not adhere to or deposit on the surface of the die, which leads to less die galling.

Average Particle Size of Graphite Powder: Less than 5 μm

Generally, the particle size of a graphite powder used in powder metallurgy is about 5 μm to 20 μm. On the other hand, an iron-based powder generally has an average particle size of about 70 μm to 80 μm and at most about 250 μm. When the particle sizes of the graphite powder and the iron-based powder are in such a relationship, it is difficult to uniformly cover the surface of the iron-based powder with the graphite powder. In the present disclosure, the average particle size of the graphite powder is less than 5 μm in order to uniformly cover the surface of the raw material powder containing the iron-based powder with the graphite powder. On the other hand, the lower limit of the average particle size of the graphite powder is not particularly limited. However, if the particle size is too small, the energy required for grinding is increased, which is economically disadvantageous. Therefore, the average particle size of the graphite powder is preferably 100 nm or more.

Addition Amount of Graphite Powder: 0.6 Mass % to 1.0 Mass %

When the addition amount of graphite is less than 0.6 mass %, the graphite powder cannot sufficiently cover the outermost surface of the iron-based powder, and the surface of the iron-based powder is exposed. Therefore, in order to sufficiently obtain the effect of graphite powder covering, the addition amount of the graphite powder should be 0.6 mass % or more. On the other hand, although the graphite powder is finally consumed by carburizing at the time of sintering to improve the properties of the sintered body such as the strength, the properties of the sintered body are deteriorated when the addition amount of the graphite powder exceeds 1.0 mass %. Therefore, the addition amount of the graphite powder is 1.0 mass % or less. The addition amount of the graphite powder here is defined as the ratio of mass of the graphite powder ($m_g$) to the sum of mass of the raw material powder ($m_r$) and mass of the graphite powder ($m_g$), i.e. $[m_g/(m_r+m_g)\times 100]$.

[Manufacturing Method]

Next, the method of manufacturing the powder mixture for powder metallurgy will be described. The manufacturing method according to one embodiment of the present disclose includes: first mixing where a raw material powder and a binder are mixed at a temperature equal to or higher than the melting point of the binder to obtain a powder covered with binder, and second mixing where the powder covered with binder and a graphite powder having an average particle size of less than 5 μm are mixed at a temperature equal to or higher than the melting point of the binder to obtain a powder mixture for powder metallurgy.

If the binder and the graphite powder are mixed in advance, the viscosity of the binder increases. As a result, it is difficult to uniformly cover the surface of the raw material powder with the binder. Therefore, the surface of the iron-based powder is covered with the binder first and then with the graphite powder. In this way, it is possible to uniformly cover the surface of the raw material powder only with the binder. In view of the above, it is preferable to add only the binder to the raw material powder and mix them in the first mixing. Furthermore, it is preferable, without adding any more binder, to add only the graphite powder to the raw material powder covered with the binder (the powder covered with binder) and mix them in the second mixing.

In addition, if the surface of the raw material powder is covered with the binder and the graphite powder simultaneously, the surface of the graphite powder is also covered with the binder, so that the effect of graphite powder covering cannot be sufficiently obtained. Therefore, the graphite powder covering is performed after the binder covering to prevent the surface of the graphite powder from being covered with the binder. In other words, in the powder mixture for powder metallurgy obtained with the method of the present disclosure, the surface of the raw material powder is uniformly covered with the graphite powder adhered via the binder. In addition, the binder is hardly exposed on the surface of the raw material powder particle and the graphite powder is on the outer side, so that the flowability and the ejectability at the time of molding are excellent.

The mixing means of the first mixing and the second mixing is not particularly limited, and any means may be used, such as various known mixers. From the viewpoint of facilitating heating, it is preferable to use a high-speed bottom stirring mixer, an inclined rotating pan-type mixer, a rotating hoe-type mixer, or a conical planetary screw-type mixer.

The mixing temperature during the first mixing and the second mixing is equal to or higher than the melting point ($T_m$) of the binder used. In the case of using a plurality of binders with different melting points, the highest one of the melting points of the plurality of binders used is taken as the $T_m$. The mixing temperature is preferably $T_m+20°$ C. or higher, and more preferably $T_m+50°$ C. or higher. On the other hand, although the upper limit of the mixing temperature is not particularly limited, it is preferably $T_m+100°$ C. or lower, because a too high mixing temperature leads to problems such as deterioration in production efficiency and oxidization of iron-based powder.

The powder mixture obtained as described above can be used to produce a sintered body by powder metallurgy. The method of producing the sintered body is not particularly limited, and may be any production method. However, the powder mixture for powder metallurgy is usually filled into a die, compacted, optionally subjected to sizing, and then sintered. Generally, the compacting is performed in a temperature range from room temperature to 180° C. In the case where it is particularly necessary to increase the density of the green compact, warm forming can be employed so that the powder and the die are both preheated and then subjected to forming. Furthermore, the obtained sintered body may be optionally subjected to heat treatment such as carburizing-quenching, bright quenching and induction hardening to obtain a product (such as a mechanical component).

Moreover, in the present disclosure, either or both of an additional auxiliary raw material and a lubricant may be optionally added to the powder mixture for powder metallurgy after the second mixing. The additional auxiliary raw material may be similar to the above-described auxiliary raw material contained in the raw material powder. The lubricant is preferably a lubricant which is not an organic resin, and more preferably at least one lubricant selected from the group consisting of fatty acid, fatty acid amide, fatty acid bisamide, and metal soap.

EXAMPLES

The composition and function effects of the present disclosure are described in more detail below, by way of examples. Note that the present disclosure is not limited to the following examples.

Powder mixtures for powder metallurgy were prepared according to the following procedure. First, a raw material powder and a binder were mixed by a high-speed bottom stirring mixer while being heated to a predetermined mixing temperature (first mixing). The raw material powder was a raw material powder containing iron powder (atomized iron powder JIP301A manufactured by JFE Steel Corporation) as an iron-based powder and Cu powder as an auxiliary raw material. The type of binder used, the addition amount of each component, and the mixing temperature are listed in Table 1.

Next, a graphite powder was further added to the high-speed bottom stirring mixer, and mixed while being heated to the mixing temperature (second mixing). After completing the mixing, the obtained powder mixture for powder metallurgy was discharged from the mixer. The graphite powder was a commercially available graphite powder having an average particle size listed in Table 1.

For comparison, instead of adding a graphite powder in the second mixing, the graphite powder was added in the first mixing in some comparative examples. Furthermore, in some comparative examples (No. 17), the powers were mixed at room temperature without being heated in the first mixing or the second mixing. In No. 17, since the mixing was performed without heating, the surface of the raw material powder was not covered with the binder or the graphite powder.

Next, the powder mixtures for powder metallurgy thus obtained were each subjected to flow rate measurement and green compact pressing according to the following procedure.

(Flow Rate)

The obtained powder mixture for powder metallurgy in an amount of 50 g was filled into a container having an orifice diameter of 2.5 mm, and the time period from filling to discharging was measured to determine the flow rate (unit: s/50 g). The other measurement conditions were in accordance with JIS Z 2502: 2012. The flow rate is an index indicating the flowability of the mixed powder at the time of die filling, and a smaller value of flow rate means better flowability of the mixed powder. In some comparative examples, the powder mixture for powder metallurgy did not flow and was not discharged from the orifice.

(Pressing)

During the pressing, the powder mixture for powder metallurgy was pressed using a die to obtain a green compact having a diameter of 11.3 mm and a height of 11 mm. The pressure during the pressing was 686 MPa. The force required for ejecting the green compact from the die (ejection force) and the green density of the obtained green compact (average of the green compact) were measured. Die galling occurred in some comparative example so that the compaction could not be performed.

The measurement results are listed in Table 1. As can be seen from this result, the powder mixture for powder metallurgy satisfying the conditions of the present disclosure is extremely excellent in flowability, can be ejected from a die with less force, and suppresses die galling at the time of compaction.

TABLE 1

| | First mixing | | | | | | Second mixing | | | Measurement result | | | |
|---|---|---|---|---|---|---|---|---|---|---|---|---|---|
| | Raw material powder | | | Binder | | | Graphite powder | | | | | | |
| No. | Iron-based powder Type | Cu powder (auxiliary raw material) Addition amount *1 (mass %) | Graphite powder Addition amount *2 (mass %) | Type | Melting point (° C.) | Addition amount *3 (mass %) | Addition amount *2 (mass %) | Average particle size (μm) | Mixing temperature (° C.) | Flow rate (s/50 g) | Green density (g/cm$^3$) | Ejection force (MPa) | Remarks |
| 1 | 301A | 2 | 0.8 | Copolymerized polyamide | 116 | 0.4 | — | 4 | 170 | 30.0 | 7.09 | 16.1 | Comparative example |
| 2 | 301A | 2 | — | Copolymerized polyamide | 116 | 0.4 | 0.8 | 4 | 170 | 23.4 | 7.15 | 13.7 | Example |
| 3 | 301A | 2 | 0.8 | Copolymerized polyamide | 116 | 0.6 | — | 4 | 170 | Not flowing | 7.04 | 18.8 | Comparative example |
| 4 | 301A | 2 | — | Copolymerized polyamide | 116 | 0.6 | 0.8 | 4 | 170 | 27.1 | 7.11 | 13.0 | Example |
| 5 | 301A | 2 | 0.8 | Polyurethane | 90 | 0.4 | — | 4 | 140 | Not flowing | 7.09 | 14.6 | Comparative example |

TABLE 1-continued

| | First mixing | | | | | | Second mixing Graphite powder | | | Measurement result | | | |
|---|---|---|---|---|---|---|---|---|---|---|---|---|---|
| | Raw material powder | | | | | | | | | | | | |
| | Iron-based powder Type | Cu powder (auxiliary raw material) Addition amount *1 (mass %) | Graphite powder Addition amount *2 (mass %) | Binder Type | Melting point (° C.) | Addition amount *3 (mass %) | Addition amount *2 (mass %) | Average particle size (μm) | Mixing temperature (° C.) | Flow rate (s/50 g) | Green density (g/cm³) | Ejection force (MPa) | Remarks |
| No. | | | | | | | | | | | | | |
| 6 | 301A | 2 | — | Polyurethane | 90 | 0.4 | 0.8 | 4 | 140 | 25.1 | 7.17 | 11.9 | Example |
| 7 | 301A | 2 | 0.8 | Polyurethane | 90 | 0.6 | — | 4 | 140 | Not flowing | 7.04 | 16.5 | Comparative example |
| 8 | 301A | 2 | — | Polyurethane | 90 | 0.6 | 0.8 | 4 | 140 | 28.5 | 7.11 | 10.9 | Example |
| 9 | 301A | 2 | 0.8 | Polyurethane | 99 | 0.6 | — | 4 | 140 | Not flowing | 7.10 | 15.3 | Comparative example |
| 10 | 301A | 2 | — | Polyurethane | 99 | 0.6 | 0.8 | 4 | 140 | 28.6 | 7.15 | 12.7 | Example |
| 11 | 301A | — | — | Copolymerized polyamide | 116 | 0.3 | 0.6 | 4 | 170 | 24.2 | 7.16 | 12.5 | Example |
| 12 | 301A | 2 | — | Copolymerized polyamide | 116 | 0.05 | 0.8 | 4 | 170 | Not flowing | Not compacted due to galling | | Comparative example |
| 13 | 301A | 2 | — | Copolymerized polyamide | 116 | 1.0 | 0.8 | 4 | 170 | Not flowing | 7.01 | 18.2 | Comparative example |
| 14 | 301A | 2 | — | Copolymerized polyamide | 116 | 0.6 | 03 | 4 | 170 | Not flowing | Not compacted due to galling | | Comparative example |
| 15 | 301A | 2 | — | Copolymerized polyamide | 116 | 0.6 | 1.2 | 4 | 170 | 27.4 | 7.05 | 10.8 | Comparative example |
| 16 | 301A | 2 | — | Copolymerized polyamide | 116 | 0.6 | 0.8 | 17 | 170 | Not flowing | Not compacted due to galling | | Comparative example |
| 17 | 301A | 2 | — | Copolymerized polyamide | 116 | 0.5 | 0.8 | 4 | Room temperature | 28.9 | 7.00 | 17.7 | Comparative example |
| 18 | 301A | 2 | — | Stearic acid amide | 100 | 0.8 | 0.8 | 4 | 125 | 30.2 | 7.11 | 12.8 | Example |
| 19 | 301A | 2 | — | Erucic acid amide | 81 | 0.8 | 0.8 | 4 | 110 | 31.2 | 7.13 | 12.1 | Example |
| 20 | 301A | 2 | — | Ethylene-bis stearic acid amide | 145 | 0.8 | 0.8 | 4 | 160 | 28.8 | 7.12 | 13.9 | Example |
| 21 | 301A | 2 | — | Ethylene-bis oleic acid amide | 119 | 0.8 | 0.8 | 4 | 140 | 29.2 | 7.14 | 11.3 | Example |

*1 Mass of Cu powder/(mass of iron-based powder + mass of Cu powder + mass of graphite powder) × 100
*2 Mass of graphite powder/(mass of iron-based powder + mass of Cu powder + mass of graphite powder) × 100
*3 Mass of binder/(mass of iron-based powder + mass of Cu powder + mass of graphite powder) × 100

The invention claimed is:

1. A powder mixture for powder metallurgy, comprising a raw material powder, a binder, and a graphite powder, wherein
    the raw material powder contains an iron-based powder in a content of 90 mass % or more of the raw material powder,
    the graphite powder has an average particle size of less than 5 µm,
    a ratio of mass of the binder ($m_b$) to the sum of mass of the raw material powder ($m_r$) and mass of the graphite powder ($m_g$), expressed as $[m_b/(m_r+m_g)\times 100]$, is 0.10 mass % to 0.80 mass %,
    a ratio of mass of the graphite powder ($m_g$) to the sum of mass of the raw material powder ($m_r$) and mass of the graphite powder ($m_g$), expressed as $[m_g/(m_r+m_g)\times 100]$, is 0.6 mass % to 1.0 mass %,
    surface of the raw material powder is covered with at least a part of the binder,
    surface of the binder covering the surface of the raw material powder is covered with at least a part of the graphite powder and,
    surface of the graphite powder covering the surface of the binder is not covered with the binder.

2. The powder mixture for powder metallurgy according to claim 1, wherein the raw material powder contains at least one auxiliary raw material selected from the group consisting of alloying powder and machinability improvement powder.

3. The powder mixture for powder metallurgy according to claim 1, wherein the binder is at least one selected from the group consisting of copolymerized polyamide and polyethylene.

4. The powder mixture for powder metallurgy according to claim 1, wherein the binder is at least one selected from the group consisting of fatty acid amide, copolymerized polyamide, polyurethane, and polyethylene.

5. The powder mixture for powder metallurgy according to claim 4, wherein the raw material powder contains at least one auxiliary raw material selected from the group consisting of alloying powder and machinability improvement powder.

6. A method of manufacturing a powder mixture for powder metallurgy according to claim 1, comprising:
    first mixing where a raw material powder and a binder are mixed at a temperature equal to or higher than a melting point of the binder to obtain a powder covered with binder, and
    second mixing where the powder covered with binder and a graphite powder having an average particle size of less than 5 µm are mixed at a temperature equal to or higher than the melting point of the binder to obtain a powder mixture for powder metallurgy, wherein
    the raw material powder contains an iron-based powder in a content of 90 mass % or more of the raw material powder,
    a ratio of mass of the binder ($m_b$) to the sum of mass of the raw material powder ($m_r$) and mass of the graphite powder ($m_g$), expressed as $[m_b/(m_r+m_g)\times 100]$, is 0.10 mass % to 0.80 mass %, and
    a ratio of mass of the graphite powder ($m_g$) to the sum of mass of the raw material powder ($m_r$) and mass of the graphite powder ($m_g$), expressed as $[m_g/(m_r+m_g)\times 100]$, is 0.6 mass % to 1.0 mass %.

7. The method of manufacturing a powder mixture for powder metallurgy according to claim 6, wherein the raw material powder contains at least one auxiliary raw material selected from the group consisting of alloying powder and machinability improvement powder.

8. The method of manufacturing a powder mixture for powder metallurgy according to claim 6, wherein the binder is at least one selected from the group consisting of fatty acid amide, copolymerized polyamide, polyurethane, and polyethylene.

9. The method of manufacturing a powder mixture for powder metallurgy according to claim 8, wherein the raw material powder contains at least one auxiliary raw material selected from the group consisting of alloying powder and machinability improvement powder.

* * * * *